United States Patent [19]

Nakaura

[11] Patent Number: 5,497,667
[45] Date of Patent: Mar. 12, 1996

[54] TORQUE DETECTING APPARATUS

[75] Inventor: Shunsuke Nakaura, Gose, Japan

[73] Assignee: Koyo Seiko Co., Ltd., Osaka, Japan

[21] Appl. No.: 408,998

[22] Filed: Mar. 23, 1995

[30] Foreign Application Priority Data

Mar. 25, 1994 [JP] Japan .................................. 6-056303

[51] Int. Cl.⁶ ...................................................... G01L 3/02
[52] U.S. Cl. ................................. 73/862.328; 73/862.329
[58] Field of Search ........................ 73/862.34, 862.328, 73/862.329, 862.331; 324/209

[56] References Cited

U.S. PATENT DOCUMENTS

| 3,950,986 | 4/1976 | Farinson | 73/862.328 X |
|---|---|---|---|
| 4,020,685 | 5/1977 | Van Millingen et al. | 73/862.328 |
| 4,352,295 | 10/1982 | Maehara et al. | 73/862.328 X |
| 4,444,063 | 4/1984 | Snowden et al. | 73/862.328 X |
| 4,805,463 | 2/1989 | Kelledes et al. | 73/862.331 |
| 4,829,834 | 5/1989 | Nasom | 73/862.329 X |
| 4,907,460 | 3/1990 | Taniguchi et al. | 73/862.331 |
| 5,307,690 | 5/1994 | Hanazawa | 73/862.331 X |

FOREIGN PATENT DOCUMENTS 6-174570  6/1994  Japan .

Primary Examiner—Richard Chilcot
Assistant Examiner—Elizabeth L. Dougherty
Attorney, Agent, or Firm—Darby & Darby

[57] ABSTRACT

A torque detecting apparatus which includes two detection systems, each formed with a switching element, a sample hold circuit and an output circuit, to be alternately operated, thereby successively outputting, as a signal, torque detected by a torque detecting coil.

4 Claims, 17 Drawing Sheets

TORQUE DETECTING APPARATUS

BACKGROUND OF THE INVENTION

1. Field of the Invention

The present invention relates to a torque detecting apparatus such as a torque sensor suitable to be used in power steering apparatus for an automobile.

2. Description of Related Art

A power steering apparatus for assisting the steering force of an automobile includes a torque detecting apparatus for detecting torque applied to a steering shaft through the operation of a steering wheel. A motor for assisting the steering force is driven in accordance with the torque detected by the torque detecting apparatus.

FIG. 1 is a half sectional view in the vicinity of a torque detecting coil in the conventional torque detecting apparatus used in the power steering apparatus. An input axis 1, to which a steering wheel (not shown) is fixed, is coaxially connected to an output axis 2, to which a steering mechanism (not shown) is fixed, with a torsion bar TB interposed therebetween. Around the outer periphery of the input axis 1 is fixed a detecting ring 3 made of a cylindrical magnetic substance so as to be penetrated by the input axis 1. Around the outer periphery of the output axis 2 is fixed another detecting ring 4 made of a cylindrical magnetic substance so as to be penetrated by the output axis 2.

A number of rectangular teeth 3a are formed with equal pitches in the peripheral direction therebetween around the left edge of the detecting ring 3. A number of rectangular teeth 4a are also formed with equal pitches in the peripheral direction therebetween around the right edge of the detecting ring 4 so as to correspond to the teeth 3a of detecting ring 3. A magnetic cylindrical body 5 having an inner flange is disposed around the outer surfaces of the detecting rings 3 and 4 at a position where the detecting ring 3 opposes the detecting ring 4. The cylindrical body 5 contains a torque detecting coil L1 wound on the inner surface of the cylindrical body 5 along the peripheral direction.

To one terminal of the torque detecting coil L1 is applied a reference voltage by a reference voltage generating circuit (not shown). When a reference voltage is applied, the cylindrical body 5 forms a magnetic circuit together with the detecting rings 3 and 4. Therefore, the inductance of the torque detecting coil L1 varies in accordance with the state of the magnetic circuit.

When the input axis 1 is rotated, the torsion bar TB is twisted to be supplied with rotation torque. Simultaneously, the opposing area between the teeth 3a of the detecting ring 3 and the teeth 4a of the detecting ring 4 is varied, thereby varying the inductance of the torque detecting coil L1.

At this point, when the other terminal of the torque detecting coil L1 is grounded via a resistor, the voltage at this terminal is decreased with a time constant defined by the inductance of the torque detecting coil L1 and the resistance of the resistor. Accordingly, the inductance of the torque detecting coil L1 can be detected by measuring the voltage at this terminal of the torque detecting coil L1 when a predetermined time has passed since the terminal is grounded. Further, the extent of the torsion of the torsion bar TB, i.e., the rotation torque applied to the torsion bar TB, can be also detected.

FIG. 2 is a block diagram of an exemplified configuration of the conventional torque detecting apparatus. A reference voltage Vref of a reference voltage generating circuit 10 is applied to one terminal of the torque detecting coil L1. The other terminal of the torque detecting coil L1 is connected to a sample hold circuit 14, and also to one terminal of a switching element 41 via a resistor R. The other terminal of the switching element 41 is grounded. The control terminal of the switching element 41 and the sample hold circuit 14 are supplied with the output of a pulse generating circuit 40. The output of the sample hold circuit 14 is supplied to an amplifier 15.

The operation of such a torque detecting apparatus will now be described.

The reference voltage Vref of the reference voltage generating circuit 10 is always supplied to one terminal of the torque detecting coil L1. Under this condition, when a pulse signal for switching on is supplied to the switching element 41 by the pulse generating circuit 40, the switching element 41 is on for the duration of the pulse width, thereby grounding the other terminal of the torque detecting coil L1 via the resistor R. As a result, the voltage at this grounded terminal of the torque detecting coil L1 is decreased with a time constant defined by the inductance thereof and the resistance of the resistor R. FIG. 3 shows the waveform of the voltage decreased by thus grounding the switching element 41.

At a predetermined time td (shorter than the width of the pulse signal for switching on) after the output of the pulse signal to the switching element 41, the pulse generating circuit 40 outputs a one-shot pulse (a sampling pulse) for sampling to the sample hold circuit 14. The sample hold circuit 14, in response to the one-shot pulse, samples and holds a voltage Vs under the voltage decrease as is shown in FIG. 3. The held voltage value is amplified by the amplifier 15 to be outputted as a torque signal voltage corresponding to the rotation torque. This procedure is repeated thereafter.

FIG. 4 is a block diagram showing an exemplified configuoeration of the pulse generating circuit 40. FIG. 5 is a timing chart showing the waveform of each signal in the pulse generating circuit 40. A pulse signal A (shown in FIG. 5) generated by a pulse generator 42 is supplied to the switching element 41 as the pulse signal for switching on, and is also supplied to a timer circuit 43. The timer circuit 43 counts the predetermined time td after the supply of the pulse signal A, and then outputs a pulse signal B (shown in FIG. 5) to a one-shot pulse generating circuit 44. The one-shot pulse generating circuit 44 receives the pulse signal B, and simultaneously outputs a one-shot pulse signal C (shown in FIG. 5) for sampling to the sample hold circuit 14. This procedure is repeated thereafter.

Such a conventional torque detecting apparatus, however, disadvantageously has limited reliability because it contains only one detection system from the reference voltage generating circuit up to the amplifier through the torque detecting coil, due to spatial restriction in the installation of the apparatus.

SUMMARY OF THE INVENTION

The present invention was devised to overcome the aforementioned problem, and one objective of the invention is providing a torque detecting apparatus having high reliability.

The torque detecting apparatus of this invention comprises a torque detecting coil to which a reference voltage is applied at one end thereof and whose inductance is varied in accordance with torque to be detected; two switching means for switching between making and breaking the other end of the torque detecting coil; control means for controlling the two switching means to be alternately operated; two sample hold circuits for sampling and holding a transient voltage value at a time of switching the torque detecting coil under control of the control means; and output means for converting the voltage value held by each the sample hold circuits into a signal corresponding to the torque and for outputting the signal. Thus, the torque is detected by two detection systems, resulting in increasing the reliability of the torque detecting apparatus.

Another objective of the invention is providing a torque detecting apparatus having high reliability and not being affected by the variation of the ambient temperature.

It is characterized in that the torque detecting apparatus of this invention further comprises temperature compensating means to which the reference voltage is applied at one end thereof and two differential amplifying means for amplifying a difference between the output of the temperature compensating means and the output of each of the two sample hold circuits.

Alternatively, it is characterized in that the torque detecting apparatus of this invention further comprises a temperature compensating coil to which the reference voltage is applied at one end thereof; two compensating switching means for switching between making and breaking the temperature compensating coil; two compensating sample hold circuits for sampling and holding a transient voltage value of the temperature compensating coil; and two differential amplifying means for receiving the outputs of the sample hold circuits respectively corresponding to the temperature compensating coil and the torque detecting coil so as to amplify a difference between the outputs.

Moreover, the torque detecting apparatus of this invention further comprises a resistor to which the reference voltage is applied at one end thereof; a thermistor connected in series to the resistor; and two differential amplifying means for amplifying a difference between a divided voltage obtained from the reference voltage applied to a node between the resistor and the thermistor and the output of each of the two sample hold circuits.

Therefore, the variation in the detected torque due to the temperature variation is offset, resulting in realizing the detection of torque without being affected by the temperature variation.

The above and further objects and features of the invention will more fully be apparent from the following detailed description with accompanying drawings.

DESCRIPTION OF THE PREFERRED EMBODIMENTS

The present invention will now be described in detail referring to the accompanying drawings illustrating the embodiments thereof.

Figure 1:
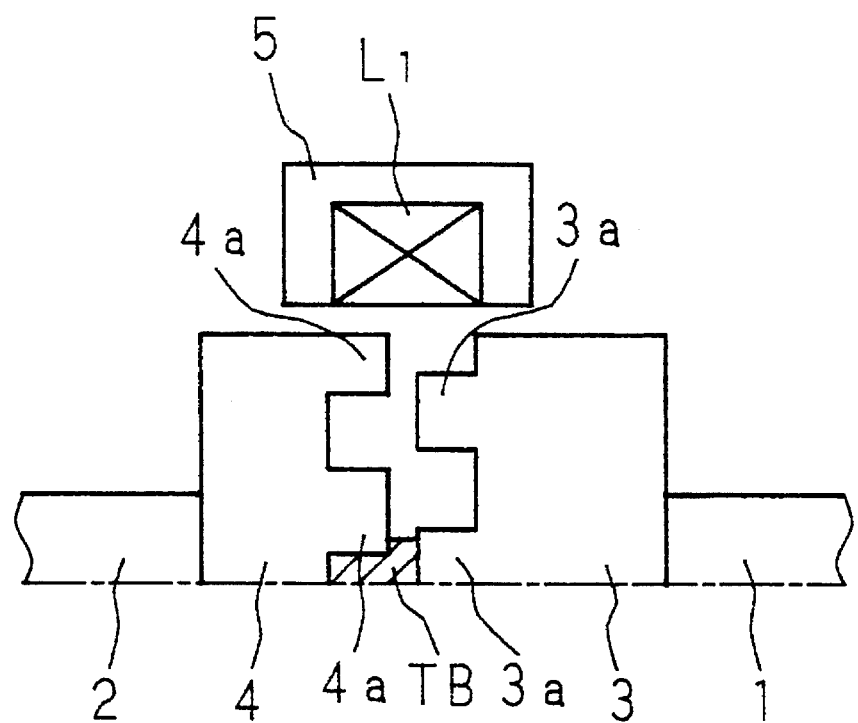
FIG. 1 is a half sectional view in the vicinity of a torque detecting coil in a conventional torque detecting apparatus.
Figure 2:
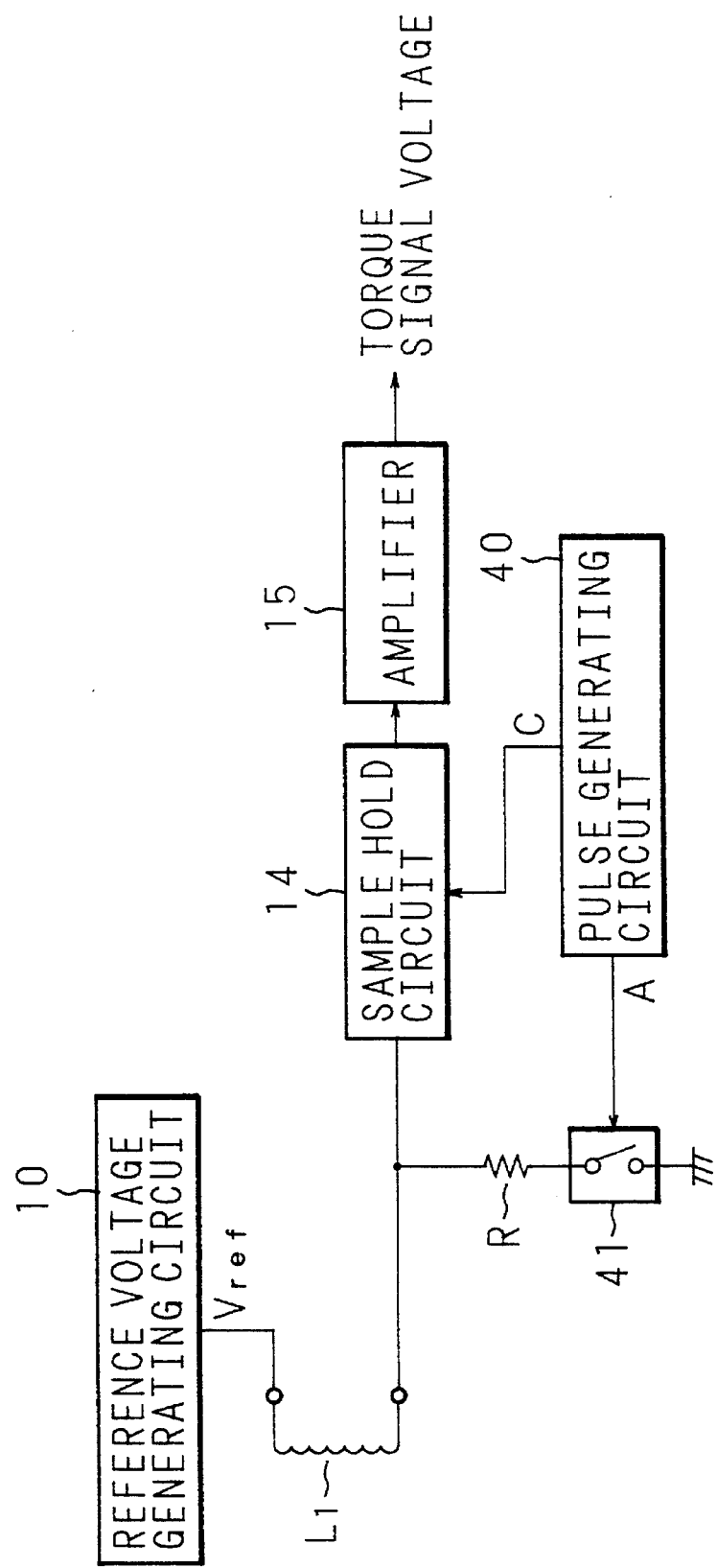
FIG. 2 is a block diagram showing an exemplified configuration of the conventional torque detecting apparatus.
Figure 3:
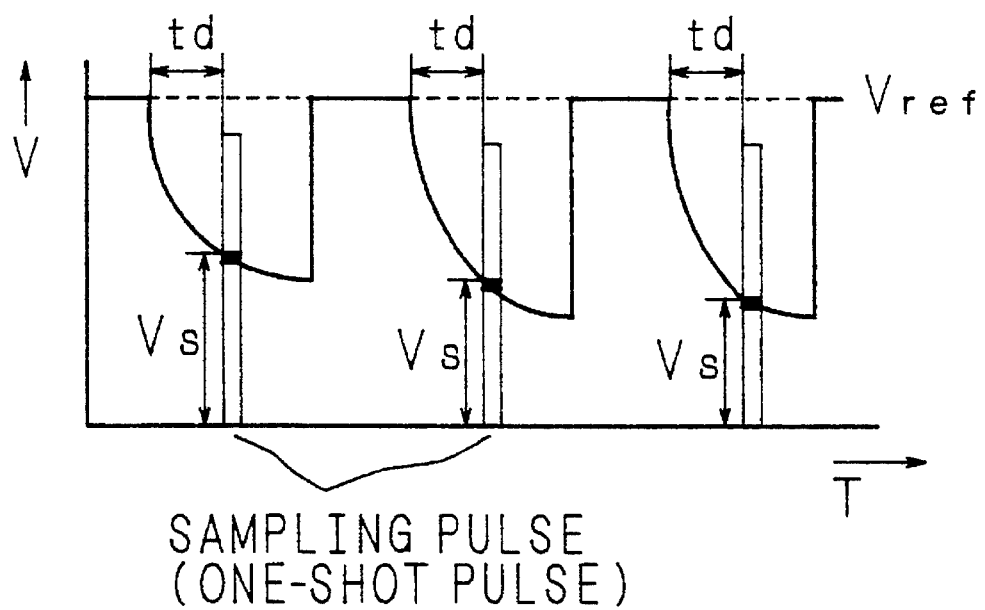
FIG. 3 shows the voltage waveform under decrease caused by grounding a switching element in the conventional torque detecting apparatus.
Figure 4:
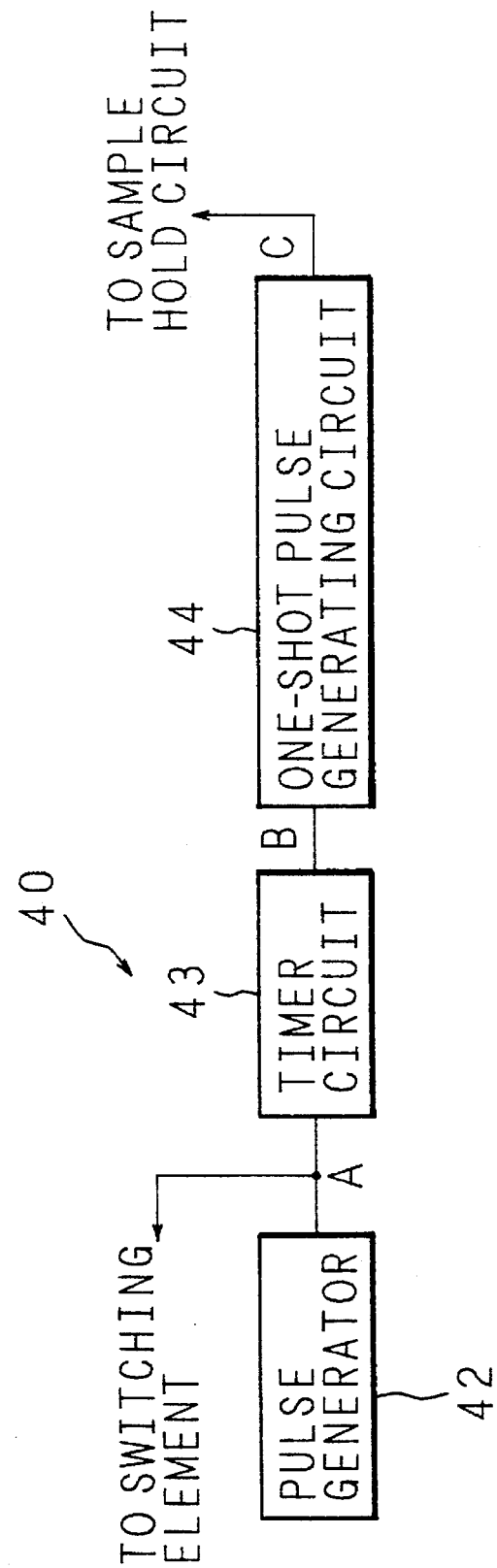
FIG. 4 is a block diagram showing an exemplified configuration of a pulse generating circuit in the conventional torque detecting apparatus.
Figure 5:
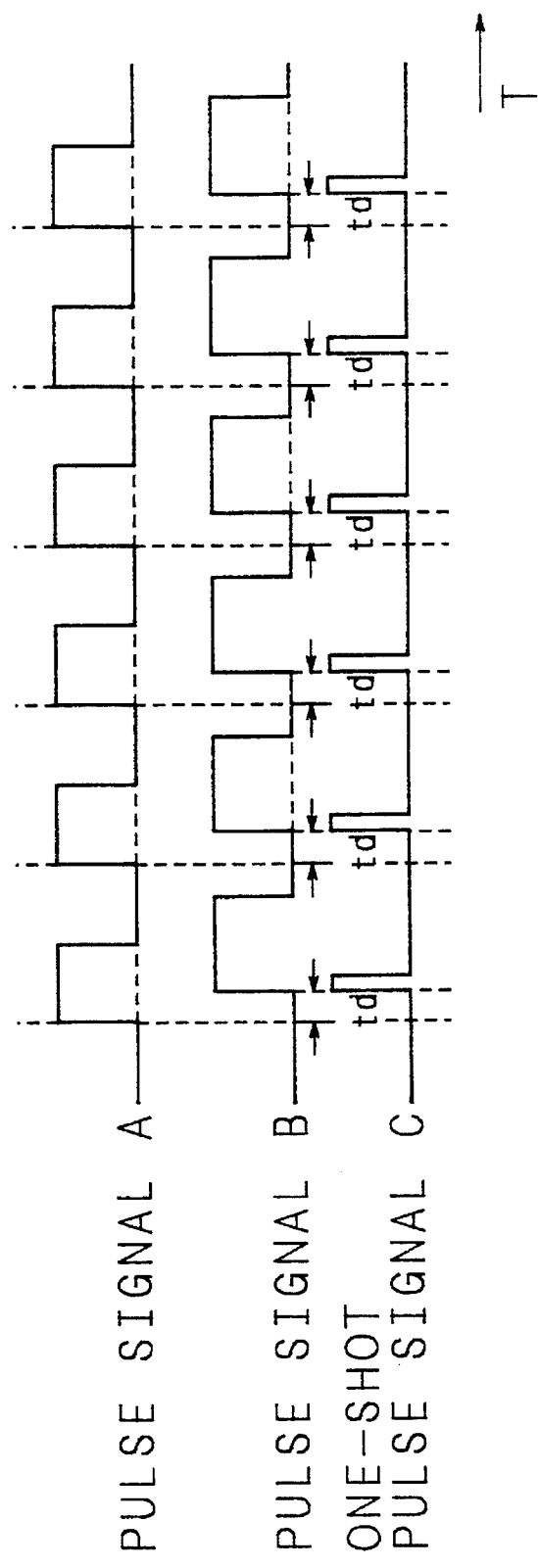
FIG. 5 is a timing chart showing the waveform of each signal in the conventional pulse generating circuit.
Figure 6:
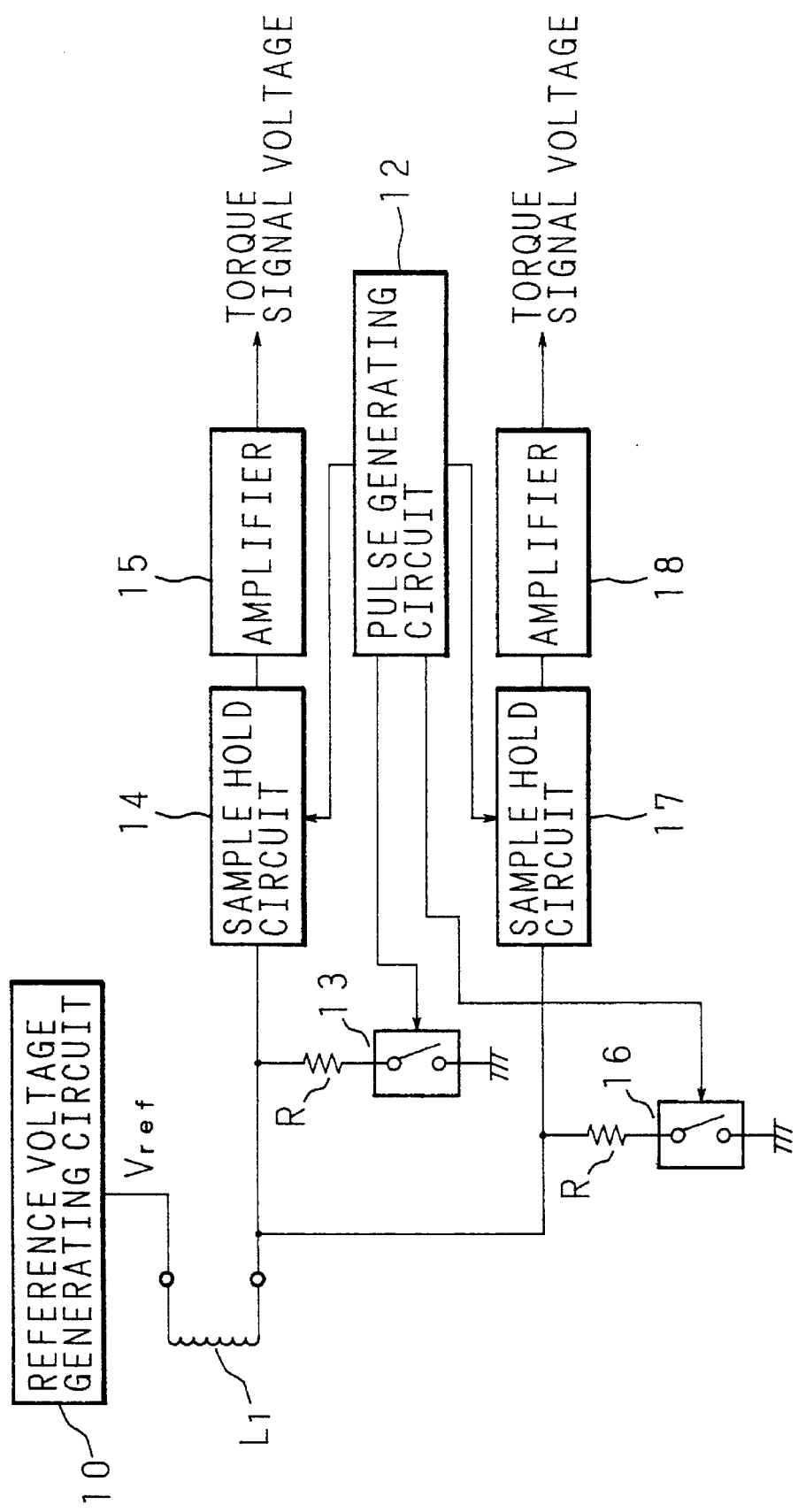
FIG. 6 is a block diagram showing the configuration of a torque detecting apparatus according to a first embodiment of the invention.

FIG. 6 is a block diagram showing the configuration of a torque detecting apparatus according to a first embodiment of the invention. A reference voltage Vref of a reference voltage generating circuit 10 is supplied to one terminal of a torque detecting coil L1. The other terminal of the torque detecting coil L1 is connected to a main sample hold circuit 14, and also to one terminal of a main switching element 13 via a resistor R. The other terminal of the main switching element 13 is grounded.

The other terminal of the torque detecting coil L1 is connected to a sub sample hold circuit 17, and also to one terminal of a sub switching element 16 via another resistor R. The other terminal of the sub switching element 16 is grounded.

The main sample hold circuit 14, the main switching element 13, the sub sample hold circuit 17 and the sub switching element 16 are connected to a pulse generating circuit 12 with output lines from the pulse generating circuit 12. The main sample hold circuit 14 and the sub sample hold circuit 17 are connected to a main amplifier 15 and a sub amplifier 18 with output lines from the sample hold circuits, respectively.

The operation of such a torque detecting apparatus will now be described.

Figure 7:
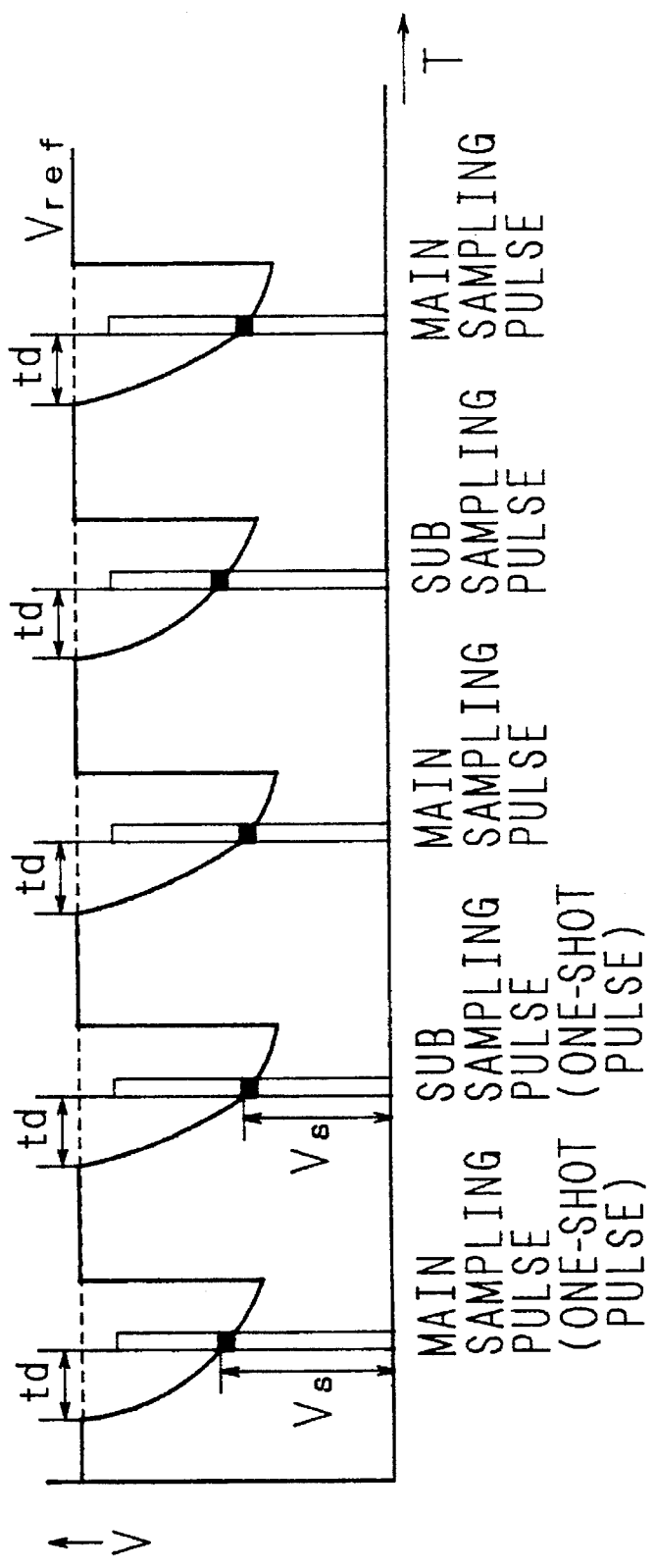
FIG. 7 shows the voltage waveform under decrease caused by grounding a switching element in the present torque detecting apparatus.

The reference voltage Vref of the reference voltage generating circuit 10 is always supplied to one terminal of the torque detecting coil L1. Under this condition, when a pulse signal for switching on is supplied to the main switching element 13 by the pulse generating circuit 12, the main switching element 13 is on for the duration of the pulse width, thereby grounding the other terminal of the torque detecting coil L1 via the resistor R. At this point, the voltage at this terminal of the torque detecting coil L1 is decreased with a time constant defined by the inductance of the torque detecting coil L1 and the resistance of the resistor R then. FIG. 7 shows the waveform of the voltage Vref and the voltage at this terminal under voltage decrease caused by grounding the torque detecting coil L1.

When a predetermined time td (shorter than the width of the pulse signal for switching on) has passed since the pulse signal for switching on was outputted to the main switching element 13, the pulse generating circuit 12 outputs a one-shot pulse (a sampling pulse) for sampling to the main sample hold circuit 14. The main sample hold circuit 14, in response to the one-shot pulse, samples and holds a voltage Vs under the voltage decrease as is shown in FIG. 7. The held voltage value is amplified by the main amplifier 15 to be outputted as a torque signal voltage corresponding to the rotation torque then.

After finishing a series of operations by such a main detection system, the pulse generating circuit 12 sends a pulse signal for switching on to the sub switching element 16. The sub switching element 16 is on for the duration of the pulse width of this pulse signal, thereby grounding the other terminal, that is connected to the resistor R, of the torque detecting coil L1 via the resistor R. At this point, the voltage at this terminal of the torque detecting coil L1 is decreased with the time constant defined by the inductance of the torque detecting coil L1 and the resistance of the resistor R then.

When the predetermined time td (shorter than the width of the pulse signal for switching on) has passed since the pulse signal was outputted to the sub switching element 16, the pulse generating circuit 12 outputs a one-shot pulse for sampling to the sub sample hold circuit 17. The sub sample hold circuit 17, in response to the one-shot pulse, samples and holds a voltage under the voltage decrease as is shown in FIG. 7. The held voltage value is amplified by the sub amplifier 18 to be outputted as a torque signal voltage corresponding to the rotation torque.

After finishing a series of operations by such a sub detection systems the pulse generating circuit 12 sends a pulse signal for switching on to the main switching element 13 again. Thereafter, the operations of the main and sub detection systems are alternately repeated at equal time intervals. Accordingly, the main sample hold circuit 14 and the sub sample hold circuit 17 alternately repeat the sampling operations by sampling pulses of the main system and the sub system at equal time intervals.

Figure 8:
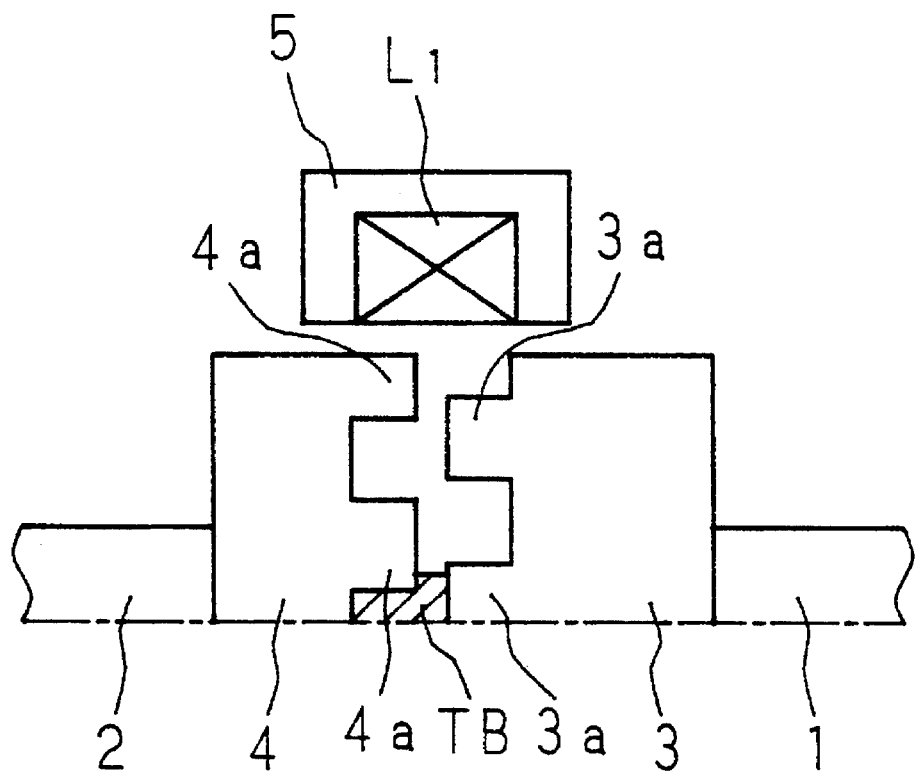
FIG. 8 is a half sectional view in the vicinity of a torque detecting coil in the torque detecting apparatus of FIG. 6.

FIG. 8 is a half sectional view in the vicinity of the torque detecting coil L1 of the invention. An input axis 1, to which a steering wheel (not shown) is fixed, is coaxially connected to an output axis 2, to which a steering mechanism (not shown) is fixed, with a torsion bar TB interposed therebetween. Around the outer periphery of the input axis 1 is fixed a detecting ring 3 made of a cylindrical magnetic substance so as to be penetrated by the input axis 1. Around the outer periphery of the output axis 2 is fixed a detecting ring 4 made of a cylindrical magnetic substance so as to be penetrated by the output axis 2.

A number of rectangular teeth 3a are formed around the left edge of the detecting ring 3 with equal pitches therebetween in the peripheral direction. A number of rectangular teeth 4a are formed around the right edge of the detecting ring 4 with equal pitches therebetween in the peripheral direction so as to correspond to the teeth 3a of detecting ring 3. A magnetic cylindrical body 5 having an inner flange is disposed around the outer peripheral surfaces of the detecting rings 3 and 4 at a position where the detecting ring 3 opposes the detecting ring 4. The cylindrical body 5 contains the torque detecting coil L1 wound on the inner peripheral surface of the cylindrical body 5.

One terminal of the torque detecting coil L1 is supplied with a reference voltage by the reference voltage generating circuit 10 (shown in FIG. 6). When the reference voltage is applied, the cylindrical body 5 forms a magnetic circuit together with the detecting rings 3 and 4. Therefore, the inductance of the torque detecting coil L1 varies in accordance with the state of the magnetic circuit.

When the input axis 1 is rotated, the torsion bar TB is twisted to be supplied with rotation torque. Simultaneously, the opposing area between the teeth 3a of the detecting ring 3 and the teeth 4a of the detecting ring 4 is varied, thereby varying the inductance of the torque detecting coil L1.

At this point, when the other terminal of the torque detecting coil L1 is grounded via the resistor R (shown in FIG. 6), a voltage at this terminal is decreased with a time constant defined by the inductance of the torque detecting coil L1 and the resistance of the resistor R. Accordingly, the inductance of the torque detecting coil L1 can be detected by measuring the voltage at this terminal of the torque detecting coil L1 at the predetermined time td after grounding the terminal. Further, the extent of the torsion of the torsion bar TB, i.e., the rotation torque applied to the torsion bar TB, can be also detected.

Figure 9:
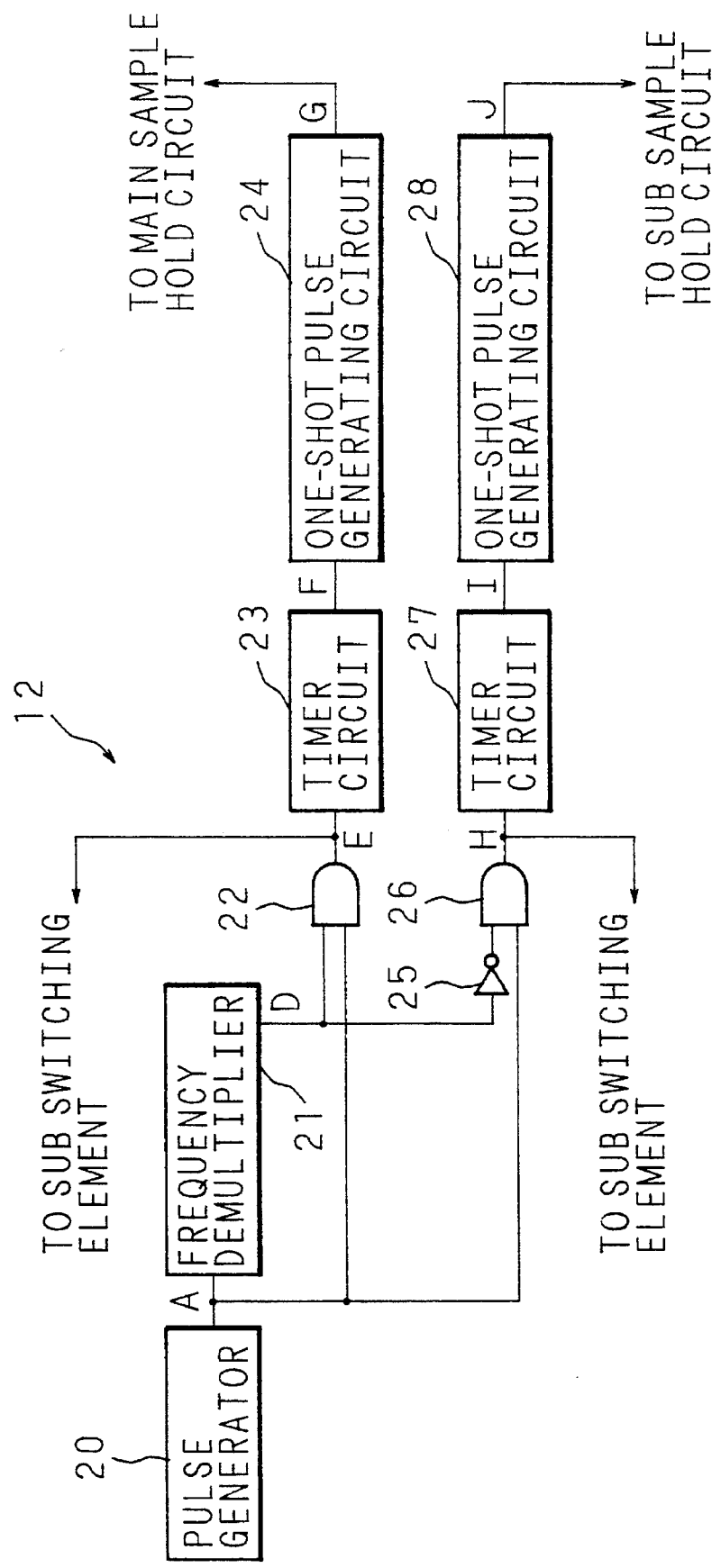
FIG. 9 is a block diagram showing the configuration of a pulse generating circuit used in the torque detecting apparatus of FIG. 6.
Figure 10:
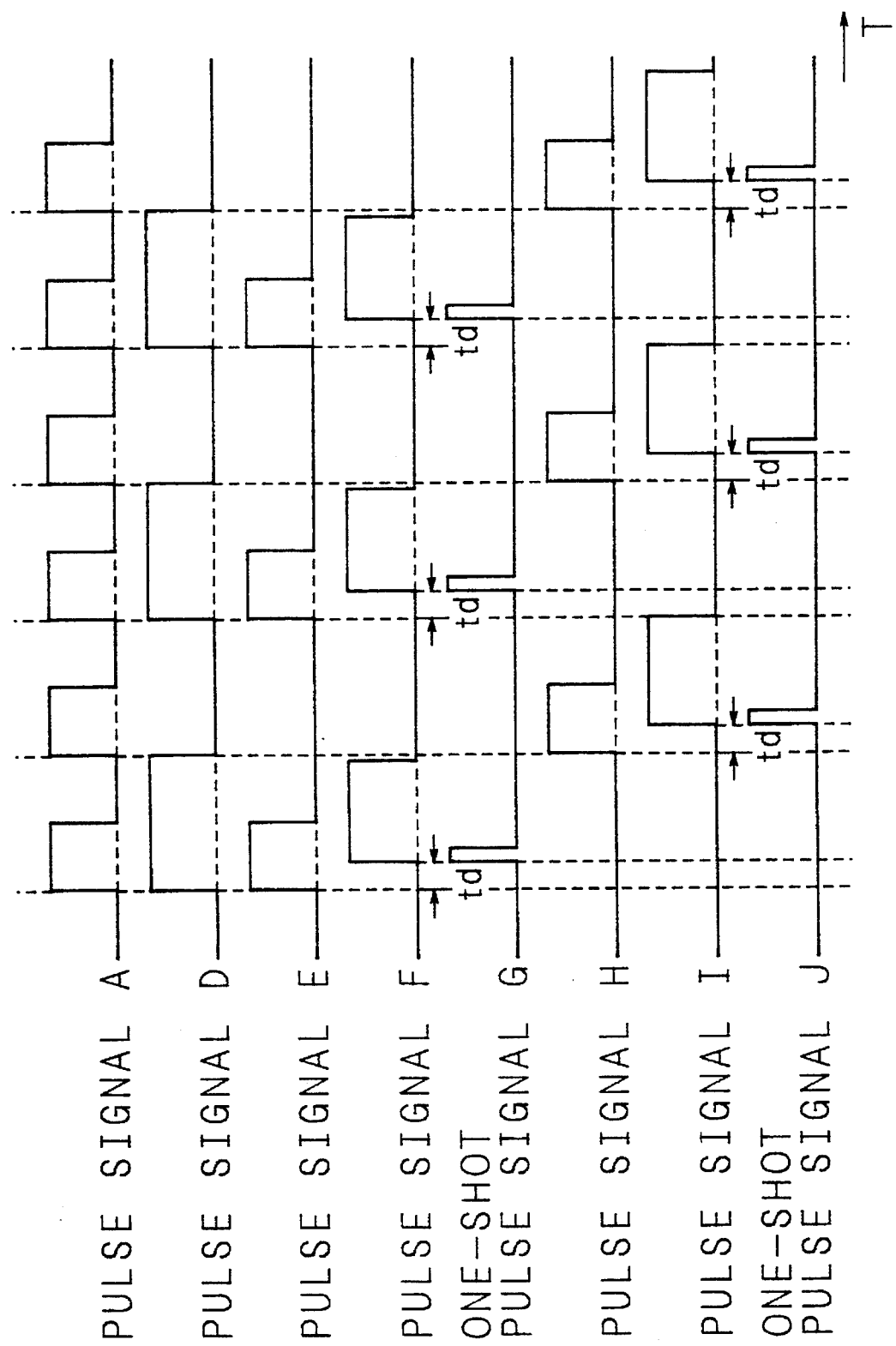
FIG. 10 is a timing chart showing the waveform of each signal in the pulse generating circuit of FIG. 9.

FIG. 9 is a block diagram showing an exemplified configuration of the pulse generating circuit 12, and FIG. 10 is a timing chart showing the waveform of each signal in the pulse generating circuit 12. A pulse signal A generated by a pulse generator 20 is supplied to a frequency demultiplier 21 for doubling the frequency of the pulse signal A, and also to one of the input terminals of each of AND circuits 22 and 26. A pulse signal D generated by doubling the frequency of the pulse signal A in the frequency demultiplier 21 is supplied to the other input terminal of the AND circuit 22 and the other input terminal of the AND circuit 26 via an inverter 25. As a result, the AND circuit 22 and the AND circuit 26 alternately output a pulse signal E and a pulse signal H both having a pulse width equal to that of the pulse signal A, respectively, synchronously with the doubled frequency of the pulse signal A.

The AND circuit 22 supplies the pulse signal E not only to the main switching element 13 as the pulse signal for switching on but also to a timer circuit 23. The timer circuit 23 counts the predetermined time td after the supply of the pulse signal E, and then outputs a pulse signal F to a one-shot pulse generating circuit 24. The one-shot pulse generating circuit 24 receives the pulse signal F, and simultaneously outputs a one-shot pulse signal G for sampling to the main sample hold circuit 14 (shown in FIG. 6).

When a period equal to the frequency of the pulse signal A has passed since the AND circuit 22 outputted the pulse signal E, the AND circuit 26 supplies the pulse signal H not only to the sub switching element 16 (shown in FIG. 6) as the pulse signal for switching on but also to a timer circuit 27. The timer circuit 27 counts the predetermined time td after the supply of the pulse signal H, and then outputs a pulse signal I to a one-shot pulse generating circuit 28. The one-shot pulse generating circuit 28 receives the pulse signal I, and simultaneously outputs a one-shot pulse signal J for sampling to the sub sample hold circuit 17 (shown in FIG. 6). Thereafter, the pulse signal E and the pulse signal H are alternately outputted by the AND circuit 22 and the AND circuit 26, respectively at equal time intervals so as to repeat the aforementioned procedure.

Figure 11:
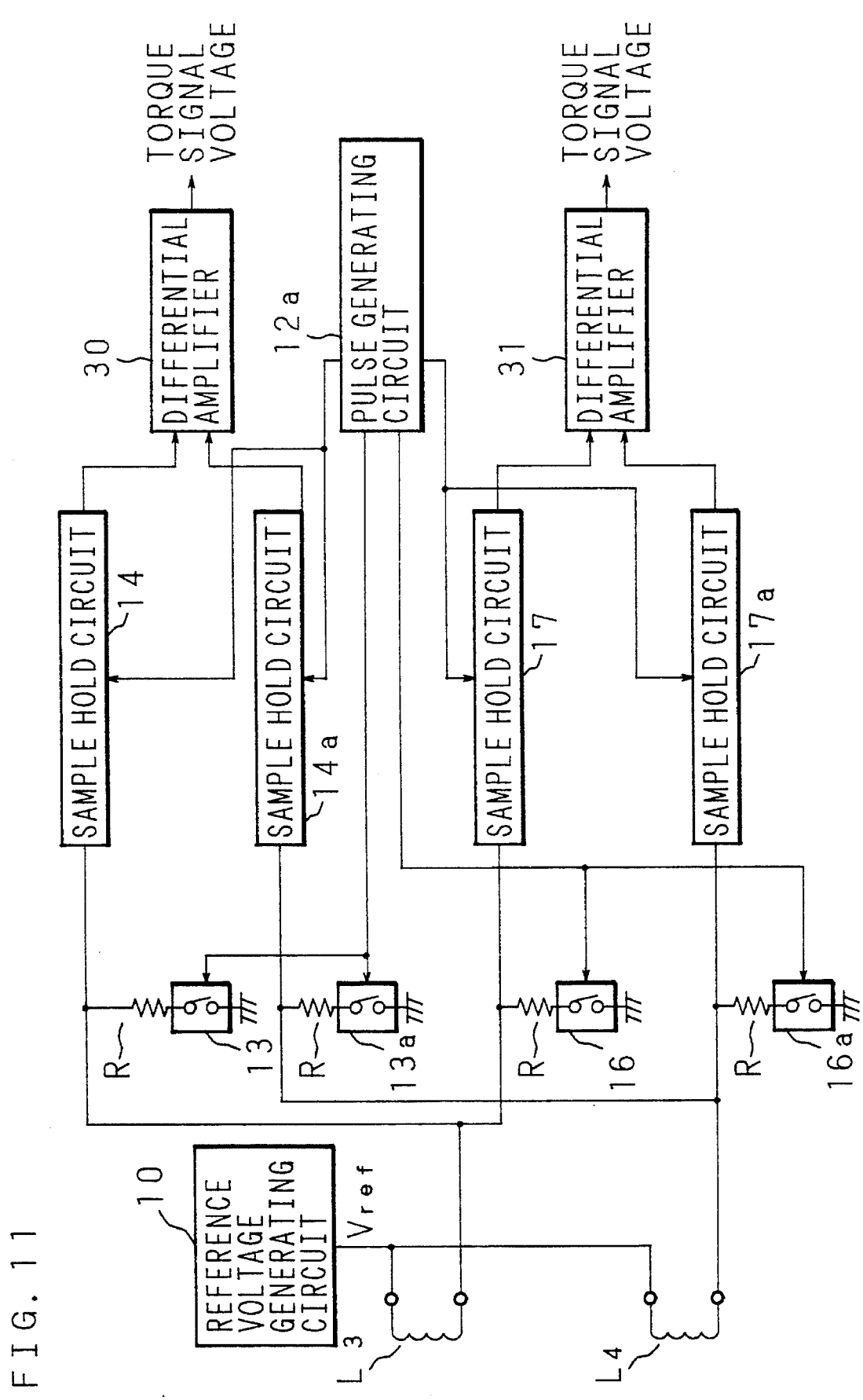
FIG. 11 is a block diagram showing the configuration of a torque detecting apparatus according to a second embodiment of the invention.

FIG. 11 is a block diagram showing the configuration of a torque detecting apparatus according to a second embodiment of the invention. In addition to the same configuration as that of FIG. 6, according to the first embodiment of the invention in the vicinity of a torque detecting coil L3 (corresponding to the torque detecting coil L1 of FIG. 6) is disposed a temperature compensating coil L4, which is the same to the torque detecting coil L3 but is provided so as not to be affected by the variation of torque. The temperature compensating coil L4 is supplied with a reference voltage Vref by a reference voltage generating circuit 10 in the same manner as the torque detecting coil L3. The torque detecting coil L4 is connected to a main detection system including a main compensating switching element 13a and a sample hold circuit 14a and to a sub detection system including a sub compensating switching element 16a and a sample hold circuit 17a.

The torque detecting coil L3 and the temperature compensating coil L4 receive from a pulse generating circuit 12a the same pulse signal to be transferred to the respective main detection systems, which function in the same manner. The outputs of the sample hold circuits 14 and 14a in the main detection systems of the torque detecting coil L3 and the temperature compensating coil L4 are supplied to a differential amplifier 30. In the differential amplifier 30, the voltage variation in the torque detecting coil L3 and the temperature compensating coil L4 caused by the same ambient temperature is offset, and the voltage variation in the torque detecting coil L3 alone is amplified to be outputted as a torque signal voltage.

The sub detection systems of the torque detecting coil L3 and the temperature compensating coil L4 function in the same manner as the main detection systems, thereby outputting a torque signal voltage by a differential amplifier 31. Each of the main detection systems and each of the sub detection systems are alternately operated under control of the pulse generating circuit 12a.

Figure 12:
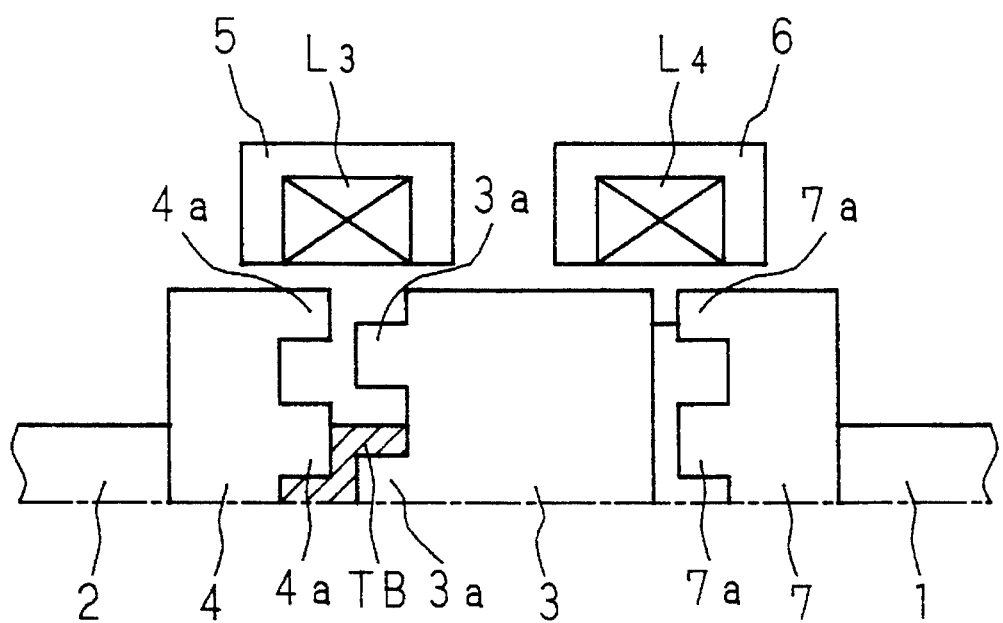
FIG. 12 is a half sectional view in the vicinity of a torque detecting coil in the torque detecting apparatus of FIG. 11.

FIG. 12 is a half sectional view in the vicinity of the torque detecting coil L3 of FIG. 11. An input axis 1, to which a steering wheel (not shown) is fixed, is coaxially connected to an output axis 2, to which a steering mechanism (not shown) is fixed, with a torsion bar TB interposed therebetween. Around the outer periphery of the input axis 1 are disposed detecting rings 7 and 3 made of a cylindrical magnetic substance with an appropriate distance in the axial direction therebetween, so as to be penetrated by the input axis 1. Around the outer periphery of the output axis 2 is disposed a detecting ring 4 made of a cylindrical magnetic substance, so as to be penetrated by the output axis 2.

A number of rectangular teeth 7a are formed around the left edge of the detecting ring 7 with equal pitches therebetween in the peripheral direction. The right edge of the detecting ring 3 forms a plane vertical to the axial center of the input axis 1. A number of rectangular teeth 3a are formed around the left edge of the detecting ring 3 with equal pitches therebetween in the peripheral direction. Also a number of rectangular teeth 4a are formed around the right edge of the detecting ring 4 with equal pitches therebetween in the peripheral directions so as to correspond to the teeth 3a of detecting ring 3. A magnetic cylindrical body 6 having an inner flange is disposed around the outer peripheral surfaces of the detecting rings 7 and 3 at a position where the detecting rings 7 and 3 oppose each other. The cylindrical body 6 contains the temperature compensating coil L4 wound on the inner peripheral surface of the cylindrical body 6. A magnetic cylindrical body 5 having an inner flange is also disposed around the outer peripheral surfaces of the detecting rings 3 and 4 at a position where the detecting rings 3 and 4 oppose each other. The cylindrical body 5 contains the torque detecting coil L3 wound on the inner peripheral surface of the cylindrical body 5.

One terminal, each of the torque detecting coil L3 and the temperature compensating coil L4 is supplied with a reference voltage of the reference voltage generating circuit 10 (shown in FIG. 11). When the reference voltage is applied, the cylindrical body 6 forms a magnetic circuit together with the detecting rings 7 and 3, and the cylindrical body 5 forms another magnetic circuit together with the detecting rings 3 and 4. Therefore, the inductance of the torque detecting coil L3 and the temperature compensating coil L4 varies depending upon the state of the magnetic circuits.

Accordingly, when the input axis 1 is rotated, the torsion bar TB is twisted to be supplied with rotation torque. Simultaneously, the opposing area of the teeth 3a of the detecting ring 3 and the teeth 4a of the detecting ring 4 is varied, thereby varying the inductance of the torque detecting coil L3.

At this point, when the other terminal of the torque detecting coil L3 is grounded via the resistor R (shown in FIG. 11), a voltage at this terminal is decreased with a time constant defined by the inductance of the torque detecting coil L3 and the resistance of the resistor R. Accordingly, the inductance of the torque detecting coil L3 can be detected by measuring the voltage at this terminal of the torque detecting coil L3 at the predetermined time td after grounding the terminal. Further, the extent of the torsion of the torsion bar TB, i.e., the rotation torque applied to the torsion bar TB, can be also detected. Moreover, since no torsion is caused between the detecting rings 7 and 3, the inductance of the temperature compensating coil L4 is not varied. Therefore, when the voltage at the grounded terminal of the temperature compensating coil L4 is measured at the predetermined time td after grounding in the same configuration and manner as in the torque detecting coil L3, a voltage variation due to the torsion of the torsion bar TB is not detected.

When the ambient temperature varies, the resistance and the inductance of the torque detecting coil L3 and the temperature compensating coil L4 are varied in accordance with the varied ambient temperature. Therefore, a difference between the measured voltages at the grounded terminals of the torque detecting coil L3 and the temperature compensating coil L4 is obtained so as to offset the variation of the resistance and the inductance caused by the varied ambient temperature. Thus, it is possible to detect the rotation torque without being affected by the ambient temperature. The rest of the configuration and the operation is the same as that of the first embodiment, and therefore, the description thereof is omitted.

Figure 13:
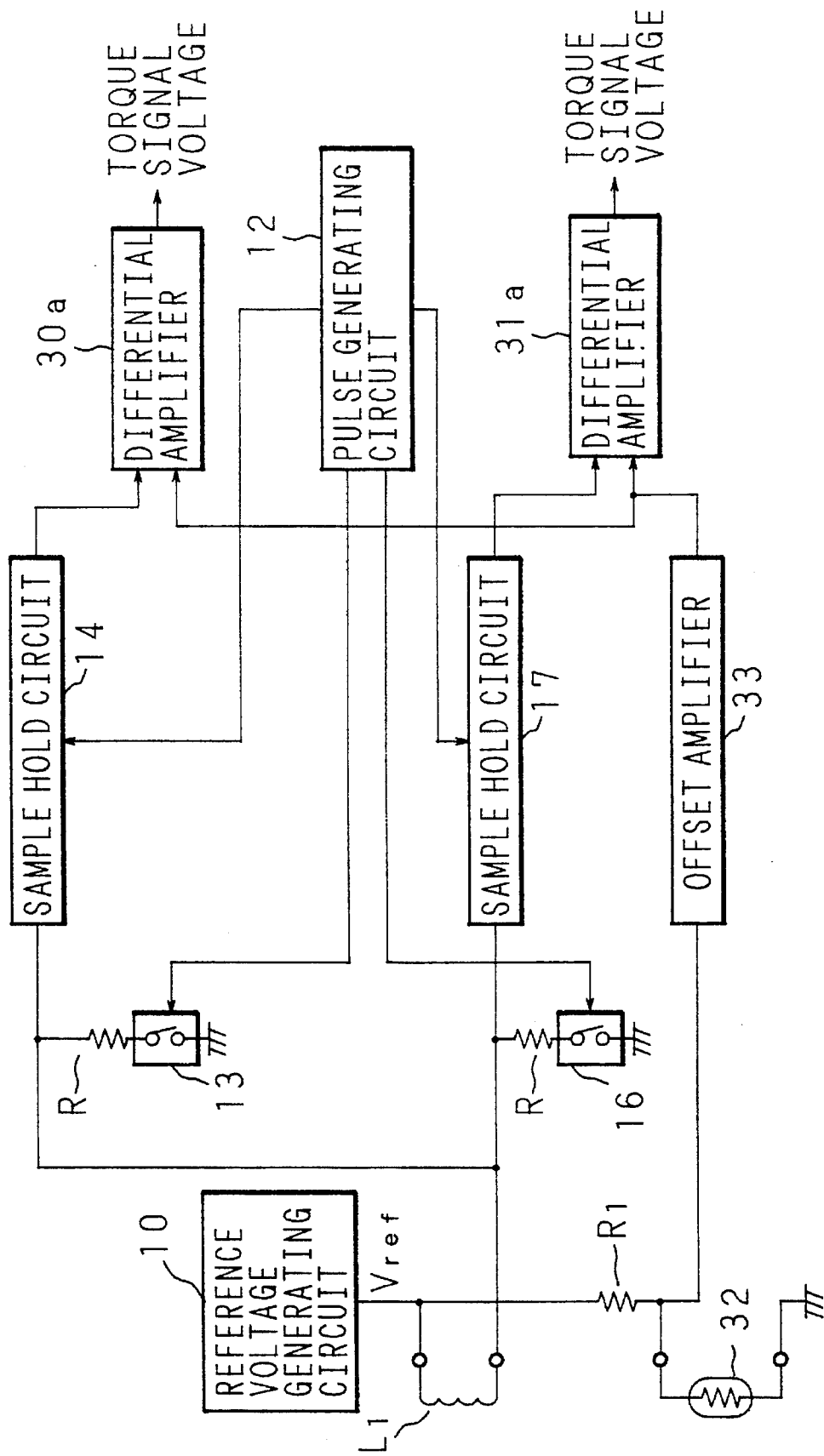
FIG. 13 is a block diagram showing the configuration of a torque detecting apparatus according to a third embodiment of the invention.

FIG. 13 is a block diagram showing the configuration of a torque detecting apparatus, in which a thermistor is provided near a torque detecting coil, according to a third embodiment of the invention. In addition to the configuration of the torque detecting apparatus of the first embodiment, a thermistor 32 is disposed in the vicinity of a torque detecting coil L1. A reference voltage Vref is applied to the thermistor 32 via a resistor R1 by a reference voltage generating circuit 10. A divided voltage obtained from the reference voltage Vref and the ground voltage by the thermistor 32 is supplied to an offset amplifier 33. The offset amplifier 33 receives the divided voltage, and outputs an offset voltage on the basis of the received divided voltage. Specifically, the offset voltage outputted by the offset amplifier 33 corresponds to a voltage variation in the torque detecting coil L1 affected by the ambient temperature. The offset voltage is supplied to differential amplifiers 30a and 31a in main and sub detection systems. Each of the differential amplifiers 30a and 31a subtracts the offset voltage, which corresponds to the voltage variation in the torque detecting coil L1 affected by the ambient temperature, from the voltage value detected by each of the main and sub detection systems, and amplifies the voltage obtained through the subtraction to be outputted as a torque signal voltage. The rest of the configuration and the operation is the same as in the first embodiment, and therefore, the description thereof is omitted.

In the aforementioned embodiments, there is no particular difference between the designations of "main" and "sub". Therefore, the main detection system can be referred to as the sub detection system, and vice versa.

Further, a microcomputer can be used as the pulse generating circuit.

Figure 14:
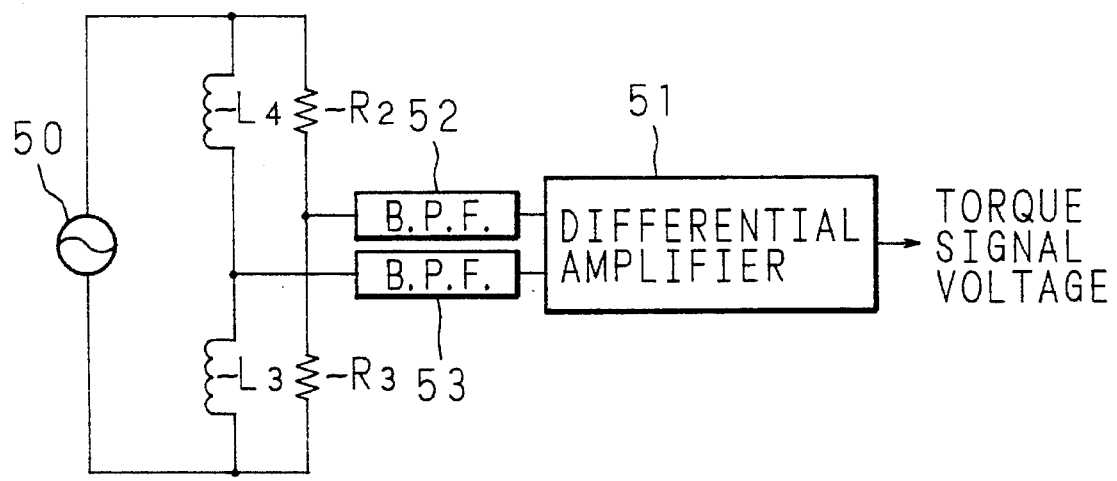
FIG. 14 is a block diagram showing an exemplified configuration of another type of torque detecting apparatus.

FIG. 14 is a block diagram showing the configuration of another torque detecting apparatus. A series circuit formed with a temperature compensating coil L4 and a torque detecting coil L3 is connected in parallel to a series circuit of resistors R2 and R3. Both ends of the thus formed parallel circuit is supplied with an oscillation voltage by an oscillator 50. A voltage at the node between the temperature compensating coil L4 and the torque detecting coil L3 and a voltage at the node between the resistors R2 and R3 are inputted to a differential amplifier 51. Thus, a bridge balanced measuring circuit is formed. Band-pass filters 52 and 53 are interposed between the respective input terminals of the differential amplifier 51 and the nodes between the resistors and between the coils, respectively.

The torque detecting coil L3 and the temperature compensating coil L4 have the same configuration as that shown in FIG. 12, whereas the reference voltage of the reference voltage generating circuit 10 in FIG. 11 is replaced with the oscillation voltage of the oscillator 50, which is applied to both the ends of the parallel circuit formed with the series circuit of the temperature compensating coil L4 and the torque detecting coil L3 and the series circuit of the resistors R2 and R3 as is shown in FIG. 14. Thus, an unbalanced potential difference between the node between the temperature compensating coil L4 and the torque detecting coil L3 and the node between the resistors R2 and R3 is obtained. Specifically, when the input axis 1 is rotated, the torsion bar TB is twisted to be supplied with rotation torque. Simultaneously, the opposing area between the teeth 3a of the detecting ring 3 and the teeth 4a of the detecting ring 4 is varied, thereby varying the impedance of the torque detecting coil L3. Since no torsion is caused between the detecting rings 7 and 3, the impedance of the temperature compensating coil L4 is not varied.

When the ambient temperature varies, the impedance of the torque detecting coil L3 and the temperature compensating coil L4 are both varied in accordance with the varied ambient temperature, and hence, both the impedance is similarly varied. Accordingly, the impedance is not an unbalanced factor in the bridge circuit.

Therefore, merely the variation in the impedance of the torque detecting coil L3 caused by the torsion of the torsion bar TB is an unbalanced factor in the bridge circuit. By detecting and amplifying the unbalanced potential difference in the differential amplifier 51 shown in FIG. 14, a torque signal voltage can be obtained. The rest of the configuration and the operation is the same as that of the second embodiment, and hence, the description thereof is omitted.

Figure 15:
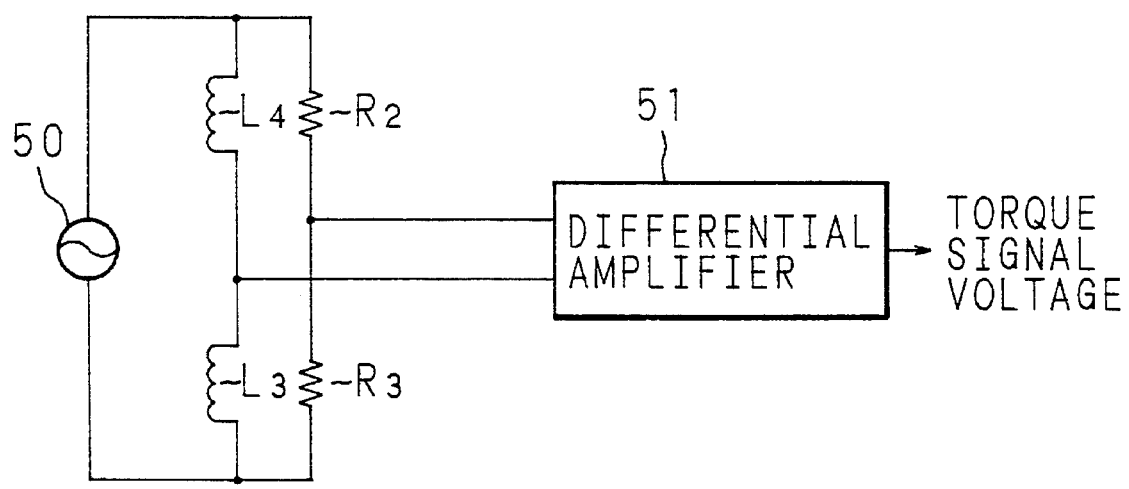
FIG. 15 is a block diagram showing a conventional configuration of a torque detecting apparatus of the same type as that shown in FIG. 14.

Such a torque detecting apparatus as mentioned above will now be compared with a conventional torque detecting apparatus. FIG. 15 is a block diagram showing the configuration of the conventional torque detecting apparatus. In this conventional torque detecting apparatus shown in FIG. 15, the band-pass filters interposed between the parallel circuit and the differential amplifier 51 in FIG. 14 are not used. Due to the lack of the band-pass filters, when an electromotive force is generated in the torque detecting coil L3 and the temperature compensating coil L4 by an external magnetic field formed by, for example, a loud-speaker magnet, a frequency component of the electromotive force can be inputted to the differential amplifier 51. This can affect the torque signal voltage value to be outputted by the differential amplifier 51. As a result, the positions of the torque detecting coil L3 and the temperature compensating coil L4 are restricted, or a magnetic shield is required to be provided.

Figure 16:
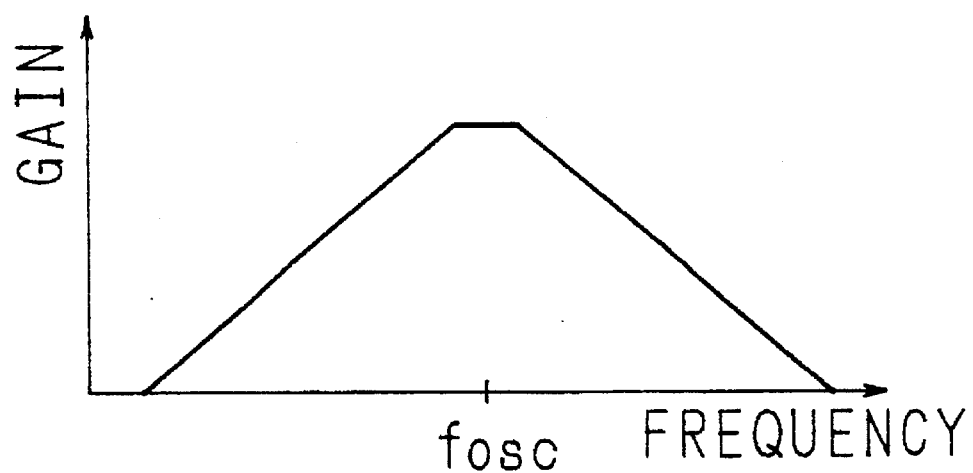
FIG. 16 shows the frequency characteristic of a band-pass filter used in the torque detecting apparatus of FIG. 14.

In the aforementioned torque detecting apparatus, however, the band-pass filters 52 and 53 are connected to the input terminals of the differential amplifier 51 as described above. The band-pass filters 52 and 53 have a frequency characteristic as is shown in FIG. 16, wherein the center frequency is equal to the oscillation frequency $f_{osc}$ of the oscillator 50. Therefore, frequency components other than the oscillation frequency $f_{osc}$ caused by a loudspeaker magnet or the like can be cut off.

In this manner, in this torque detecting apparatus, a frequency component of an electromotive force generated in the torque detecting coil and the temperature compensating coil by an external magnetic field can be cut off by the band-pass filters before entering the differential amplifier 51. As a result, there is no need to restrict the positions of the torque detecting coil and the temperature compensating coil and to provide a magnetic shield.

The band-pass filters can be replaced with high-pass filters to attain the same effect because such an external magnetic field mainly has a low frequency caused by a loudspeaker magnet or the like.

Figure 17:
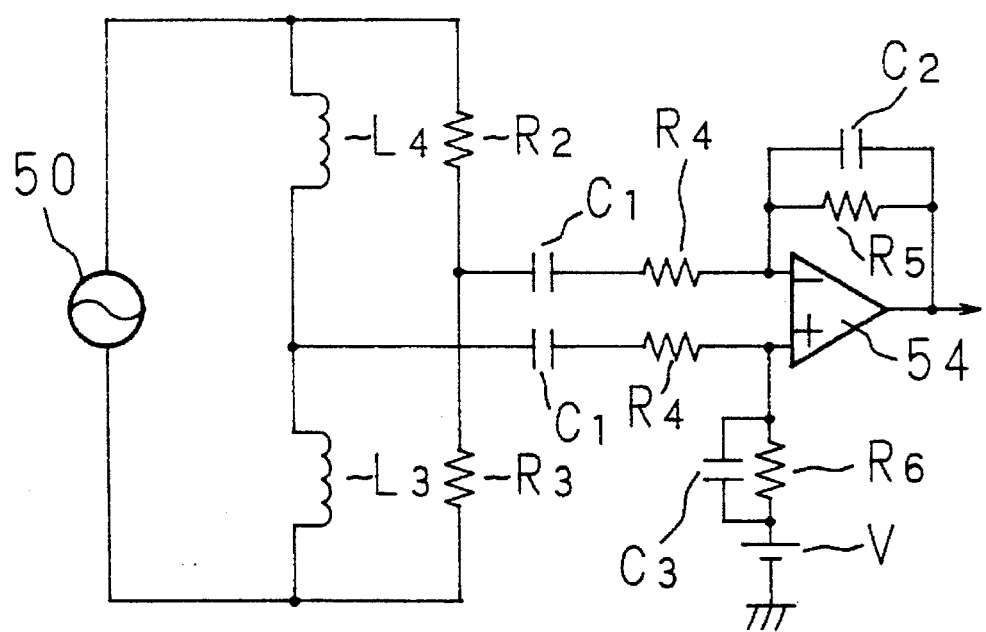
FIG. 17 is a circuit diagram showing another exemplified configuration of the torque detecting apparatus of FIG. 14.

FIG. 17 is a circuit diagram showing another exemplified configuration of this torque detecting apparatus, in which the band-pass filters 52 and 53 in FIG. 14 are replaced with high-pass filters each consisting of a series circuit of a capacitor C1 and a resistor R4. As the differential amplifier, a negative feedback circuit formed with a parallel circuit of a capacitor C2 and a resistor R5 is connected to an inverted input terminal of an OP amplifier 54, whose non-inverted input terminal is connected to one terminal of a parallel circuit of a capacitor C3 and a resistor R6. Between the other end of the parallel circuit and a ground terminal is disposed a positive constant voltage power supply V.

As described above, the torque detecting apparatus of this invention comprises two detection systems each including switching means, a sample hold circuit and output means. Therefore, the torque detecting apparatus can attain high reliability.

Moreover, since the present torque detecting apparatus comprises temperature compensating means, the torque detecting apparatus can attain high reliability without being affected by the ambient temperature.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A torque detecting apparatus, comprising:

a torque detecting coil to which a reference voltage is applied at one end thereof and whose inductance is varied in accordance with torque to be detected;

two switching means for switching between making and breaking the other end of said torque detecting coil;

control means for controlling switching operations of said two switching means;

two sample hold circuits, each for sampling and holding, under control of said control means, a transient voltage value at a time of said switching operation of each of said two switching means; and two output means, each for converting the voltage value held by each of said two sample hold circuits into a signal corresponding to said torque so as to output said signal, wherein said control means controls said two switching means so that said two switching means be alternately making and breaking.

2. A torque detecting apparatus according to claim 1, further comprising:

temperature compensating means to which said reference voltage is applied at one end thereof; and two differential amplifying means for receiving an output of said temperature compensating means, and for amplifying a difference between the received output and each output of said two sample hold circuits so as to supply each said output means.

3. A torque detecting apparatus according to claim 1, further comprising;

a temperature compensating coil to which said reference voltage is applied at one end thereof and whose inductance is not affected by the torque to be detected;

two compensating switching means for switching between making and breaking the other end of said temperature compensating coil;

two compensating sample hold circuits, each for sampling and holding, under control of said control means, a transient voltage value at a time of said switching operation of each of said two compensating switching means; and two differential amplifying means for receiving each output of said two compensating sample hold circuits and each output of said two sample hold circuits, and for amplifying a difference between the received outputs so as to supply each said output means, wherein said control means controls said two compensating switching means so that said two compensating switching means be alternately making and breaking.

4. A torque detecting apparatus according to claim 1, further comprising:

a resistor to which said reference voltage is applied at one end thereof;

a thermistor connected in series to said resistor; and two differential amplifying means for receiving a divided voltage, obtained from said reference voltage, applied to the node between said resistor and said thermistor, and each output of said two sample hold circuits, and for amplifying a difference between said divided voltage and each output of said two sample hold circuits so as to supply each said output means.

* * * * *